United States Patent [19]

Halling

[11] Patent Number: 4,779,901

[45] Date of Patent: Oct. 25, 1988

[54] SEALED RIGID PIPE JOINT

[75] Inventor: Horace P. Halling, Laurel, Md.

[73] Assignee: EG&G Pressure Science, Inc., Beltsville, Md.

[21] Appl. No.: 5,397

[22] Filed: Jan. 9, 1987

Related U.S. Application Data

[63] Continuation of Ser. No. 566,557, Dec. 29, 1983, abandoned.

[51] Int. Cl.[4] ............................................. F16L 27/04
[52] U.S. Cl. ................................... 285/184; 285/261; 285/271; 285/336; 285/367; 285/917
[58] Field of Search ............... 277/261, 263, 367, 366, 277/365, 184, 336, 917, 271, 167.5, 236

[56] References Cited

U.S. PATENT DOCUMENTS

| | | | |
|---|---|---|---|
| 1,057,939 | 4/1913 | Cooper | 285/261 |
| 1,368,786 | 2/1921 | De Graff | |
| 2,451,437 | 10/1948 | Fenlon | |
| 2,840,394 | 6/1958 | Rohr | |
| 3,047,315 | 7/1962 | Kinnison | |
| 3,178,207 | 4/1965 | Fox et al. | 285/261 X |
| 3,192,690 | 7/1965 | Taylor | 277/205 X |
| 3,217,922 | 11/1965 | Glasgow | 285/DIG. 18 |
| 3,279,806 | 10/1966 | Bialkowski | 272/236 X |
| 3,383,122 | 5/1968 | Richardson | 285/261 X |
| 3,479,061 | 11/1969 | Smookler et al. | |
| 3,669,474 | 6/1972 | Bode | 285/365 X |
| 3,797,836 | 3/1974 | Halling | 285/367 |
| 3,995,889 | 12/1976 | Carr et al. | 285/261 X |
| 4,045,054 | 8/1972 | Arnold | 285/261 X |
| 4,067,585 | 1/1978 | Rode | 277/236 X |
| 4,381,871 | 5/1983 | Dopyera et al. | 285/368 X |
| 4,452,462 | 6/1984 | Karr | 285/DIG. 18 |
| 4,457,523 | 7/1984 | Halling et al. | 277/236 |
| 4,486,037 | 12/1984 | Shotbolt | 285/261 |

FOREIGN PATENT DOCUMENTS

| | | | |
|---|---|---|---|
| 1000788 | 1/1957 | Fed. Rep. of Germany | 285/261 |
| 723092 | 3/1980 | U.S.S.R. | 285/184 |
| 777749 | 6/1957 | United Kingdom | 285/261 |
| 1126872 | 9/1968 | United Kingdom | |

Primary Examiner—Dave W. Arola
Attorney, Agent, or Firm—Roylance, Abrams, Berdo & Goodman

[57] ABSTRACT

A joint for rigidly coupling first and second pipes having high temperature fluid flowing therethrough. The joint comprises first and second annular members including mating spherical segments which are rigidly coupled, respectively, to the pipes; a coupling assembly to couple the annular members in telescoped engagement and to radially inwardly compress these members to resist relative angular movement therebetween; an annular cavity defined by the telescoped annular members and communicating with the interface of the engaged annular members; and an annular, metallic and torsionally flexible seal located in the cavity to resist fluid escape from the joint through the interface of the annular members. The joint accepts annular misalignment of the pipes as the pipes are being connected, but thereafter the coupling assembly applies the radially inwardly directed compression to the mating spherical segments to resist further relative angular movement therebetween. Each annular member comprises an annular hub and an annular flange coupled to and extending radially outwardly of the hub. The coupling assembly comprises a clamping ring engaging the flanges. In a first embodiment, both flanges are formed as one-piece members, while in a second embodiment, one of the flanges is formed from a primary and a secondary flange. In both embodiments, one of the flanges is slidably coupled to one of the hubs to accept the angular misalignment of the pipes before the joint is made rigid by the application of the clamping ring.

24 Claims, 3 Drawing Sheets

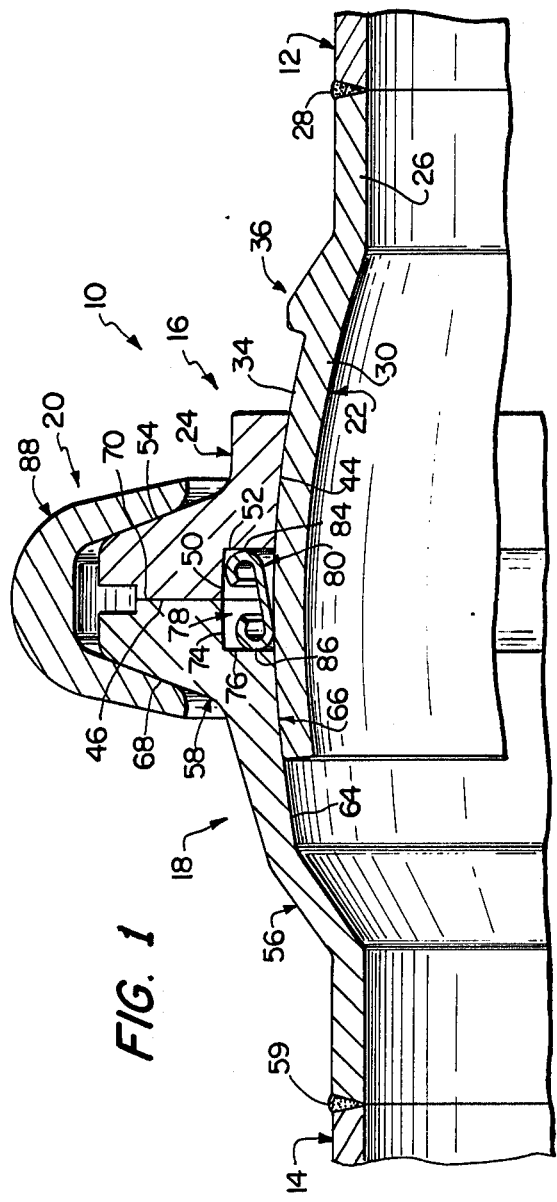
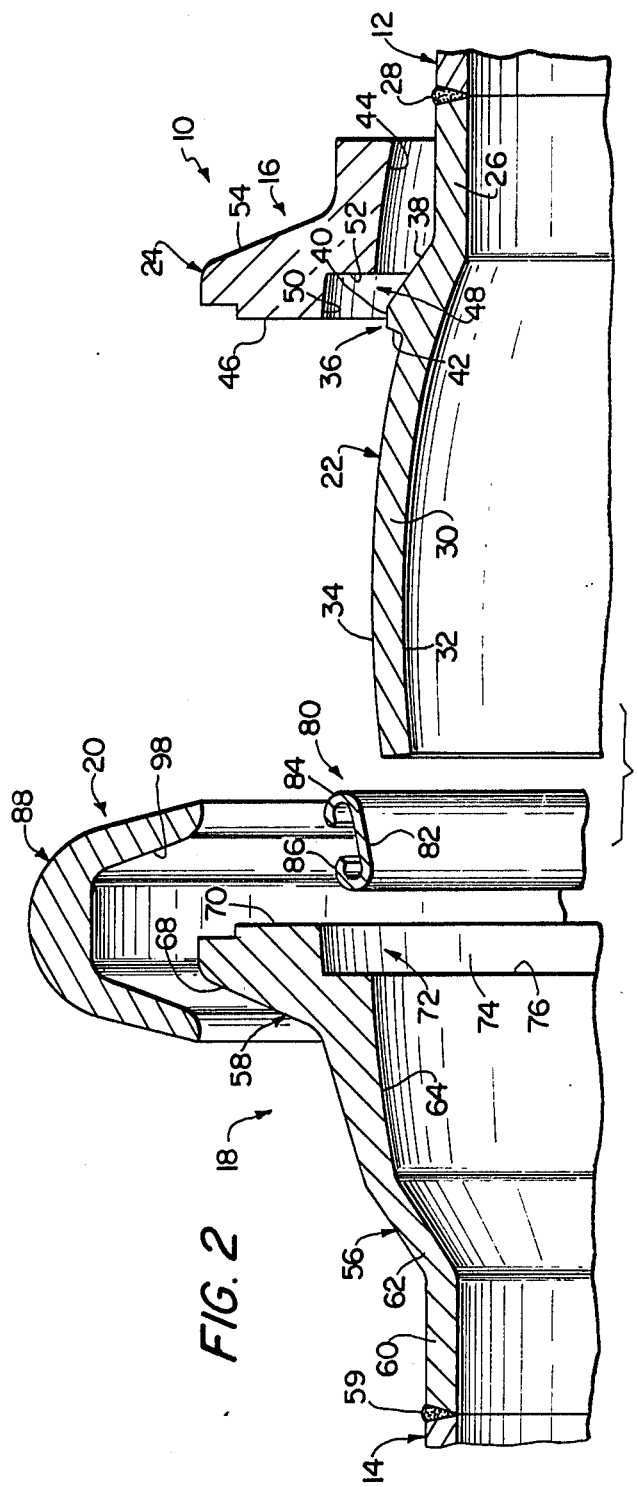

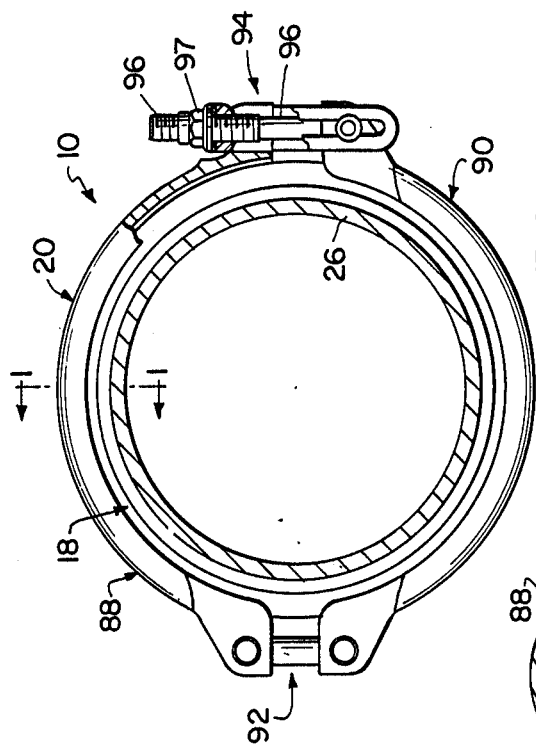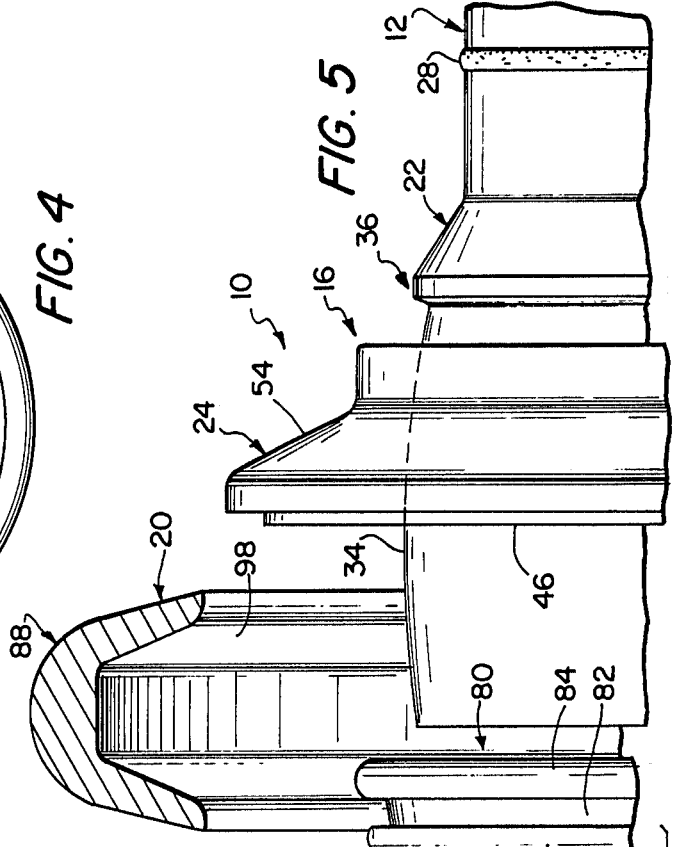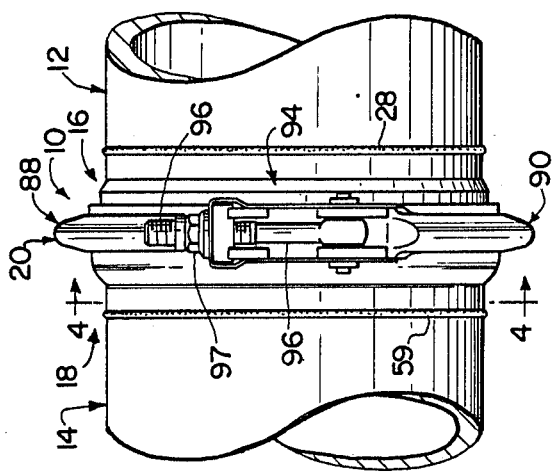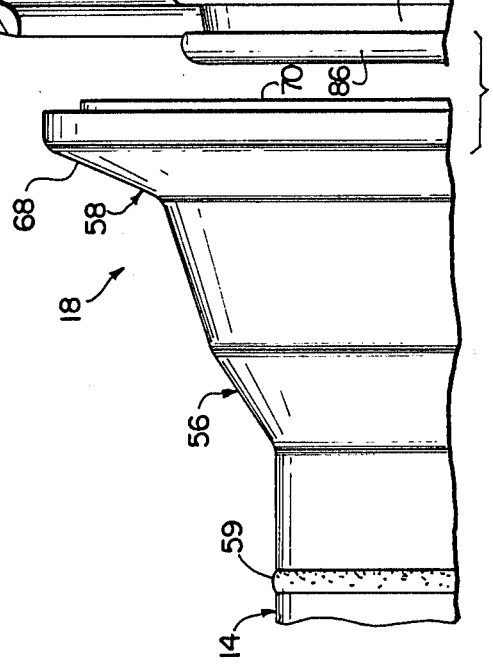

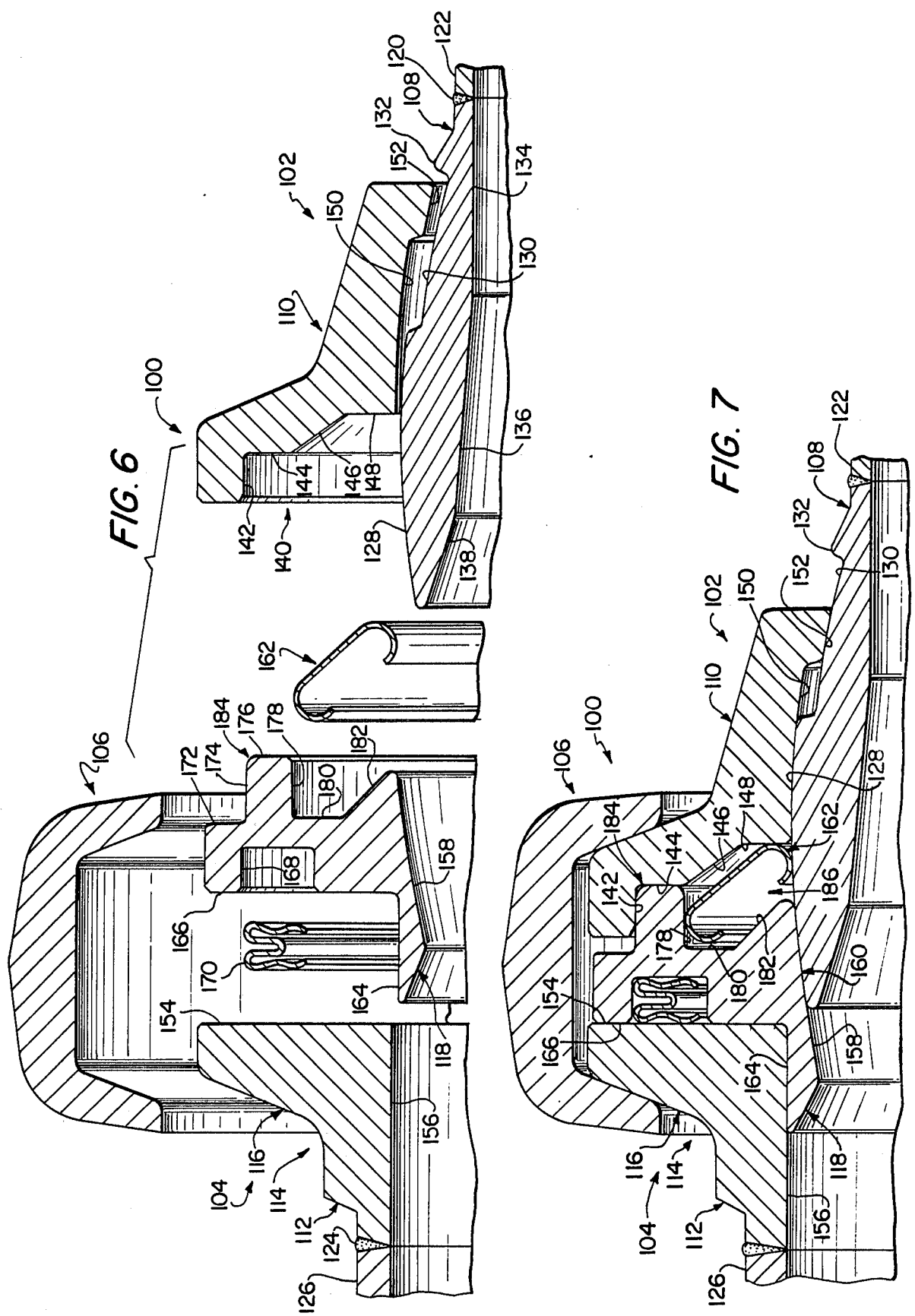

SEALED RIGID PIPE JOINT

This is a continuation of application Ser. No. 566,557, filed Dec. 29, 1983 and now abandoned.

FIELD OF THE INVENTION

The invention relates to a joint for rigidly connecting pipes having high temperature fluid flowing therethrough and includes a seal for resisting escape of the fluid. The joint comprises first and second telescoped annular members including mating spherical segments, a coupling assembly to couple the annular members in telescoped engagement, and an annular cavity defined by the annular members for receiving the seal. This seal is annular, metallic and torsionally flexible. The joint accepts angular misalignment of the pipes as the pipes are being connected, but thereafter the coupling assembly applies a radially inwardly directed compression to the mating spherical segments to resist further relative angular movement therebetween.

BACKGROUND OF THE INVENTION

In systems for conducting high temperature and pressure fluids, such as in aircraft, various pipe joints are necessary to provide connections between lengths of pipe. Some of these joints are rigid and therefore do not allow relative angular movement between the coupled pipes while others are flexible joints that allow for such movement. However, use of either type of known joint typically fails to provide a joint which both has an efficient, long lasting sealing ability and takes into consideration initial angular misalignment of the pipes due to the manufacturing tolerances built into the pipes and joints.

Thus, rigid joints are intended to rigidly connect the pipes without any angular misalignment movement after the joint is made-up and thus they tend to be unable to accept the angular misalignment caused by manufacturing tolerances. In some cases, prior art rigid joints are known that do accept certain angular misalignment tolerances; however, they are usually very heavy and do not accept a significant amount of such angular misalignment.

As for flexible joints, while they accept angular misalignment when they are made-up, they allow continuous relative angular movement between connected pipes and therefore consistently erode the sealing efficiency provided by a seal in the joint due to the constant angular movement between the pipes. Examples of such flexible joints are disclosed in U.S. Pat. Nos. 1,368,786 to de Graff; 2,451,437 to Fenlon; 2,840,394 to Rohr; 3,047,315 to Kinnison; and 3,479,061 to Smookler et al.

Thus, there is a continuing need for improvement in sealed, rigid pipe joints for use, for example, in aircraft conduit systems having high pressure and temperature fluid, such as air, flowing therethrough, which have long lasting seals and accept initial angular misalignment of the pipes.

SUMMARY OF THE INVENTION

Accordingly, a primary object of the invention is to provide a sealed, rigid pipe joint that can allow for angular misalignment due to manufacturing tolerances and yet be rigid to resist angulation once the pipes are connected to avoid deterioration of the seal.

Another object of the invention is to provide such a joint that has a torsionally flexible annular seal that is light in weight and long lasting.

Another object of the invention is to provide such a joint that has a substantially low profile and is light in weight.

A further object of the invention is to provide such a joint that is simply and quickly assembled and disassembled.

The foregoing objects are basically attained by providing a joint for rigidly coupling first and second pipes having a fluid flowing therethrough, the combination comprising a first annular member rigidly coupled to the first pipe and having an outer surface in the form of a spherical segment; a second annular member rigidly coupled to the second pipe and having an inner surface in the form of a spherical segment, the inner and outer surfaces having substantially the same radius of curvature and being engaged, such engagement defining an interface; a coupling assembly, coupled to the first and second members, for rigidly coupling the first and second members together to resist relative axial movement and for radially inwardly compressing the first and second surfaces together to resist relative angular movement, the first and second members defining a cavity communicating with the interface of the inner and outer surfaces; and an annular seal, located in the cavity, for resisting fluid escape from the first and second pipes through the interface of the inner and outer surfaces.

The foregoing objects are also attained by providing a method of rigidly joining first and second pipes having a fluid flowing therethrough, the first pipe having an end with an outer surface in the form of a spherical segment and the second pipe having an end with an inner surface in the form of a spherical segment, these surfaces having substantially the same radius of curvature, comprising the steps of engaging the outer surface on the first pipe with the inner surface on the second pipe to define an interface, sealing the interface to resist fluid escape from the first and second pipes along the interface, rigidly coupling the first and second pipes together to resist relative axial movement therebetween, and radially inwardly compressing the inner and outer surfaces together to resist relative angular movement therebetween.

Other objects, advantages and salient features of the present invention will become apparent from the following detailed description, which, taken in conjunction with the annexed drawings, discloses preferred embodiments of the invention.

DRAWINGS

Referring now to the drawings which form a part of this original disclosure:

FIG. 1 is a partial side elevational view in longitudinal section taken along line 1—1 in FIG. 4 showing the sealed rigid pipe joint in accordance with the invention in its made-up configuration;

FIG. 2 is an exploded, partial side elevational view of the apparatus shown in FIG. 1;

FIG. 3 is a reduced side elevational view of the sealed rigid pipe joint in accordance with the invention;

FIG. 4 is a left end elevational view in transverse section taken along line 4—4 in FIG. 3;

FIG. 5 is an exploded, partial side elevational view of the apparatus shown in FIGS. 1-4;

FIG. 6 is an exploded, partial side elevational view in longitudinal section of a second embodiment of the present invention in which the second flange is formed of a primary and a secondary flange; and FIG. 7 is a side elevational view similar to that shown in FIG. 6 except that the joint is fully made-up.

DETAILED DESCRIPTION OF THE INVENTION

Referring now to FIGS. 1-5, the sealed rigid pipe joint 10 in accordance with the invention couples a first pipe 12 and a second pipe 14, these pipes having fluid flowing therethrough, which can be high temperature and pressure air between, for example, 400°-1,000° F. These pipes are typically cylindrical and formed of high temperature-resistant metal. The joint 10 comprises first and second telescoped annular members 16 and 18 and a coupling assembly 20 that couples the annular members in telescoped engagement and radially inwardly compresses these members to resist relative angular movement therebetween once the joint is made-up. However, as described in more detail hereinafter, since the annular members have mating spherical segments that provide the telescoped engagement, initial angular misalignment of the pipes due to manufacturing tolerances are readily accepted. For example, the joint 10 illustrated in FIGS. 1-5 can accept angular misalignment of about 3.5°.

The first annular member 16 as seen best in FIGS. 1, 2 and 5 is comprised of a first annular hub 22 and a first annular flange 24, this flange being slidably received over and on the outer surface of the first hub as seen in FIGS. 1 and 5. The first hub 22 is comprised of a cylindrical portion 26, which is cylindrical on its inner and outer surfaces and which is welded via weld 28 to the first pipe 12, and a spherical segment 30 extending integrally from cylindrical portion 26. Spherical segment 30 has an inner surface 32 and an outer surface 34 which are arcuate along their longitudinal cross sections. On the outer surface 34 is an integral annular extension including a frustoconical surface 38 extending into a cylindrical surface 40 extending into a frustoconical surface 42, which in turn extends into the outer surface 34. This extension provides an angulation stop to limit angulation between the first flange and the first hub.

The first flange 24 has a substantially L-shaped cross section and has as its inner surface 44 a spherical segment having a radius of curvature subtantially equal to the radius of curvature of the outer surface 34 on the first hub 22. The smallest diameter of the inner surface 44 on the first flange is slightly smaller than the cylindrical surface 40 diameter so that the flange 24 can be force fit over the extension from a position seen in FIG. 2 to that seen in FIGS. 1 and 5. The largest diameter of the inner surface 44 of the flange is smaller than the largest diameter of the outer surface 34 of spherical segment 30, so the flange cannot slide off the distal end of the segment as illustrated in FIGS. 1 and 5. Moreover, this relationship prevents the hub from pulling out of the flange under an axial force to the right as seen in FIG. 1. In all events, the inner surface 44 on the flange is slidably engageable over a limited distance with the outer surface 34 on the hub.

The flange 16 also has an axially facing flat annular surface 46 that lies in a plane substantially perpendicular to the axis of the flange and hub, and an axially and radially inwardly opening groove 48 below surface 46 having a substantially rectangular cross section. This groove has an outer wall 50 that is radially inwardly facing and is arcuate in longitudinal cross section, and an axially facing flat, annular wall 52 which lies in a plane perpendicular to the longitudinal axis of the flange and hub. The flange also has a frustoconical outer surface 54 for engagement with the coupling assembly 20 as seen in FIG. 1.

The second annular member 18 is similarly formed of a second annular hub 56 and a second annular flange 58, which is integrally formed with the second hub. This hub 56 is welded via weld 59 to the second pipe 14 and comprises a cylindrical portion 60 and a frustoconical portion 62, which are integrally formed, the cylindrical portion 60 having cylindrical inner and outer surfaces and the frustoconical portion 62 similarly having frustoconical inner and outer surfaces. The second hub 56 and the second flange 58 together have an inner surface 64 that is in the form of a spherical segment and thus is arcuate in longitudinal cross section, the radius of curvature of this spherical segment being substantially the same as the radius of curvature of the outer surface 34 on the first hub 22. This allows the first and second hubs to be telescoped into mating engagement in a substantially ball and socket configuration as illustrated in FIG. 1, this engagement defining an interface 66 therebetween.

The second annular flange 58 has an outer frustoconical surface 68 for engagement by the coupling assembly 20 as seen in FIG. 1 and also has an axially facing, flat annular surface 70, which is perpendicular to the longitudinal axis of the second hub and second flange and which engages in a face to face engagement with axially facing annular surface 46 on the first flange 24 as seen in FIG. 1. The second flange 58 also has an annular groove 72 formed therein having a substantially rectangular cross section and including an outer wall 74 that is radially inwardly facing and is arcuate in longitudinal cross section, and an axially facing, flat annular wall 76 which lies in a plane substantially perpendicular to the longitudinal axis of the second hub and flange.

As seen in FIG. 1, a cavity 78 is formed by the first and second flanges and the first hub for reception of an annular seal 80. In particular this cavity is defined on its inner surface by the outer surface 34 on the first hub, on its outer surface by a combination of arcuate walls 50 and 74 in the two grooves in the two flanges, and on its opposite sides by annular wall 52 in groove 48 on the first flange and annular wall 76 in the groove 72 on the second flange.

This seal 80 is a solid annular ring, is metallic and is torsionally flexible and thereby capable of accepting radial expansion and contraction due to temperature changes without losing its elasticity. As seen in FIG. 2 the seal 80 has a substantially C-shaped transverse cross section and includes a frustoconical central portion 82, a first arcuate sealing portion 84 integrally formed with and extending from one end of the central portion, and a second arcuate sealing portion 86 integrally formed with and extending from the other end of the central portion. As seen in FIGS. 1 and 2, the central frustoconical portion 82 tapers inwardly from the first arcuate sealing portion 84 towards the second arcuate sealing portion 86. As installed, seal 80 seals the interface 66 between outer surface 34 and inner surface 64 and thereby resists escape of fluid flowing in pipes 12 and 14 by having the second arcuate sealing portion 86 engaging the outer surface 34 of the first hub and annular well 76 of the second flange, and with the first arcuate sealing portion 84 engaging annular wall 52 and arcuate wall 50 on the first flange. This configuration could be reversed with regard to the position of the seal and still maintain a seal of interface 66. Thus, the second sealing portion would engage arcuate wall 74 and annular wall 76 in the second flange, and the first sealing portion 84 would engage annular wall 52 in the first flange and the outer surface 34 on the first hub.

Each of the arcuate sealing portions 84 and 86 is substantially semi-circular in transverse cross section and faces radially outwardly from the central frustoconical portion 82. The smallest diameter of the seal is slightly less than the largest diameter of outer surface 34 where the seal is to reside so that the seal 80 can be forced onto the outer surface and is slighlty biased outwardly thereby.

This annular seal 80 is specifically disclosed and claimed in a commonly owned, prior filed U.S. patent application Ser. No. 437,869, filed on Oct. 29, 1982, by Horace P. Halling and Robert A. Barrett, and issued on July 3, 1984, as U.S. Pat. No. 4,457,532, the disclosure of which is hereby incorporated by reference.

Referring now to FIGS. 3 and 4, the coupling assembly 20 is shown comprising a pair of opposed substantially semi-circular clamp members 88 and 90, a pivot assembly 92 pivotally connecting a pair of adjacent ends of these clamp members, and a locking assembly 94 including a tightening bolt 96 threadedly receiving a threaded nut 97 for drawing the clamp members 88 and 90 together in the radially inward direction. As seen in FIG. 2, the interior of clamp member 88, as well as clamp member 90, has an inwardly opening inverted V-shaped groove 98, the walls of which engage frustoconical surfaces 54 and 68 on the flanges to force these flanges together as the clamp members are moved together via the locking assembly 94. The coupling assembly encircles the entire periphery of the flanges.

In addition, this coupling assembly, via tigthening of the clamp members, also compresses the first and second flanges radially inwardly against the outer surface 34 of the first hub to increase the frictional engagement therebetween so as to prevent relative angular movement therebetween. The coupling assembly 20 is conventional and is disclosed in U.S. Pat. No. 3,797,836, the disclosure of which if hereby incorporated by reference.

Advantageously, the first and second hubs and flanges are formed from high temperature-resistant metal, such as Inconel.

FORMATION OF THE JOINT

In forming the joint 10 in accordance with the invention shown in FIG. 1, the first flange 24 is maneuvered longitudinally over the cylindrical portion 26 of the first hub and is forced to the left over the extension 36 to a position shown in FIG. 5. Then the seal 80 is slid onto the outer surface 34 of the first hub via the distal end of the hub and this outer surface is telescoped into engagement with the inner surface 64 on the second annular member 18 as seen in FIG. 1. Next, the first flange 24 is moved towards the seal so as to position the seal in the cavity 78 and engage the flanges as shown in FIG. 1. This seals the interface 66 to resist fluid escape from the first and second pipes.

Next, the clamp members 88 and 90 are maneuvered around the now engaged first and second flanges and are moved towards one another by means of tightening the nut 97 on bolt 96 in the locking assembly 94. Once the walls defining the grooves 98 in the clamp members engage the frustoconical outer surfaces 54 and 68 in the first and second flanges, the first and second pipes are rigidly coupled together to resist relative axial movement therebetween since the first hub 22 cannot be pulled past the first flange 24. The locking assembly 94 is then further tightened so that the clamp members radially inwardly compress the flanges against the outer surface 34 of the first hub, thereby significantly increasing the friction therebetween, which in turn resists relative angular movement therebetween. In particular, the inner surface 64 on the second flange is compressed against the outer surface 34 on the first hub and the inner surface 44 on the first flange is similarly compressed against the outer surface 34 on the first hub. This compression is essentially a substantially uniform radially inwardly directed force applied to the inner and outer surfaces by the coupling assembly.

Thus, since the first flange 24 is slidably engageable with the first hub 22 and both have mating spherical segment surfaces, angular misalignment of the pipes 12 and 14, such as due to manufacturing tolerances, can be allowed and compensated for when the joint 10 is being made-up. In addition, since the coupling assembly 20 exerts a significant compression on the flanges and the hub, undesirable angular misalignment of the pipes 12 and 14 once the joint is made-up is prevented. This is advantageous since it prevents sliding of outer surface 34 against seal 80, which would deteriorate the sealing capability thereof.

EMBODIMENT OF FIGS. 6 AND 7

A second embodiment of the sealed rigid pipe joint 100 in accordance with the invention is shown in FIGS. 6 and 7, this joint 100 being similar to joint 10 shown in FIGS. 1–5 except that the second flange is formed of two pieces comprising a primary flange and a secondary flange and these are sealed with an E-seal.

As seen in FIGS. 6 and 7, the joint 100 comprises a first annular member 102, a second annular member 104 which is telescoped into mating engagement with the first annular member, and a coupling assembly 106 for rigidly coupling the annular members together to resist relative axial movement and to radially compress the telescoped annular members together in a radially inward direction to resist relative angular movement therebetween. The first annular member 102 is comprised of a first annular hub 108 and a first annular flange 110 which is slidably coupled on the outside thereof. The second annular member 104 is comprised of a second annular hub 112 and a second annular flange 114, this second flange being formed from two pieces comprising a primary flange 116 integral with the hub and a secondary flange 118.

The first hub 108 is rigidly coupled via weld 120 to a first pipe 122 and the second hub 112 is rigidly coupled via weld 124 to the second pipe 126. As seen in FIGS. 6 and 7, these pipes have different diameters.

The coupling assembly 106 is essentially the same as coupling assembly 20 shown in FIGS. 1–5 and discussed above; however, it is a little wider in transverse dimension to receive the first flange, the primary flange and the secondary flange therein.

As seen in FIG. 6, the first hub has an outer surface 128 which is in the form of a spherical segment which extends into an annular recess in the form of a spherical segment 130 with an annular extension 132 defining the other side of the recess. The inner surface of the first hub 108 comprises a cylindrical portion 134 which extends into a frustoconical portion 136 which in turn extends into a frustoconical portion 138.

The first flange 110 has an axially facing groove 140 comprising a cylindrical outer wall 142 which is radially inwardly facing, an axially facing annular wall 144 which is flat and lies in a plane substantially perpendicular to the axis of the flange, a frustoconical wall 146 and an axially facing annular wall 148 which is flat and substantially perpendicular to the longitudinal axis of the flange. Extending rearwardly from annular wall 148 the flange has a radially inwardly facing inner surface 150 which is in the form of a spherical segment. Extending radially inwardly at the end of the inner surface 150 is and annular rim 152 which is receivable and slidable along the surface of recess 130 in the hub. The radius of curvature of the outer surface 128 on the hub and the inner surface 150 on the flange is substantially the same so that the flange 110 is slidable relative to the hub 108 from the position shown in FIG. 6 to that shown in FIG. 7. The same is true regarding rim 152 and recess 130. This slidable engagement allows for manufacturing tolerance and thus angular misalignment upon making-up of the joint 100.

The second hub 112 is integrally formed with a substantially L-shaped primary flange 16 which has a flat annular axially facing wall 154 which lies in a plane substantially perpendicular to the longitudinal axis of the hub and flange and a radially inwardly facing cylindrical wall 156.

The secondary flange 118 has a radially inwardly facing inner surface 158 which is in the form of a spherical segment, the radius of curvature of which is substantially the same as the radius of curvature of outer surface 128 on the first hub. As seen in FIG. 7, this inner surface 158 receives outer surface 128 in mating telescoped engagement, thereby defining an interface 160 for sealing by seal 162.

The secondary flange has an outwardly facing cylindrical wall 164 and a radially extending, axially facing annular wall 166, this annular wall lying in a plane substantially perpendicular to the longitudinal axis of this flange. As seen in FIG. 7, walls 164 and 166 on the secondary flange receive and abut respectively annular wall 154 and cylindrical wall 156 on the primary flange 116. An annular groove 168 having a substantially rectangular cross section is formed in annular wall 166 and receives an annular E-seal 170 to seal between the interface of annular wall 166 and annular wall 154. This seal is disclosed in U.S. Pat. No. 3,192,690 to Taylor, the disclosure of which is hereby incorporated by reference.

On the axially facing side of the secondary flange, opposite annular wall 166, is a series of walls beginning at the outer periphery and including an annular wall 172, a cylindrical wall 174, an annular wall 176, a cylindrical wall 178, an annular wall 180, and a frustoconical wall 182, this frustoconical wall extending into inner surface 158. These annular walls lie in planes that are substantially perpendicular to the longitudinal axis of the secondary flange, and cylindrical walls 174 and 178 together with annular wall 176 define an axial rib 184. As seen in FIG. 7, this rib 184 engages cylindrical wall 142 and annular wall 144 in the first flange 110 when the joint is made-up.

In addition, a cavity 186 is formed between the secondary flange 118 and the first flange 110 defined by frustoconical wall 146 an annular wall 148 in the first flange, the outer surface 128 on the first hub 108, and cylindrical wall 178, annular wall 180 and frustoconical wall 182 on the secondary flange.

The annular seal 162 shown in FIGS. 6 and 7 is substantially the same as that shown in FIGS. 1–5 and discussed above; however, the angle of taper of the frustoconical central portion thereof is at a smaller angle to accommodate the dimensions of cavity 186. In all events, seal 162 is located in the cavity to seal the interface 160. As seen in FIG. 7, the seal engages the outer surface 128 of the first hub 108, annular wall 148 in the first flange 110, and the downwardly facing cylindrical wall 178 in rib 184 on the secondary flange.

The joint 100 shown in FIGS. 6 and 7 is made up substantially the same way as that discussed above regarding FIGS. 1–5, except that the primary and secondary flanges are engaged as the first hub 108 is telescoped into the secondary flange. The joint can accept angular misalignment between the pipes of about 2.5°.

The materials used in this second embodiment are substantially the same as those in the first embodiment shown in FIGS. 1–5.

While various advantageous embodiments have been chosen illustrate the invention it will be understood by those skilled in the art that various changes and modifications can be made therein without departing from the scope of the invention as defined in the appended claims.

What is claimed is:

1. A joint for rigidly coupling first and second pipes having a fluid flowing therethrough, the combination comprising:
   a first annular member rigidly coupled to the first pipe and having an outer surface in the form of a spherical segment;
   a second annular member rigidly coupled to the second pipe and having an inner surface in the form of a spherical segment;
   said inner and outer surfaces having substantially the same radius of curvature and being engaged, such engagement defining an interface;
   coupling means, coupled to said first and second members, for rigidly coupling said first and second members together to resist relative axial movement and for radially inwardly compressing said first and second surfaces together to resist relative angular movement,
   said first and second members defining a cavity communicating with the interface of said inner and outer surfaces; and
   an annular seal, located in said cavity, for resisting fluid escape from the first and second pipes through the interface of said inner and outer surfaces,
   said coupling means comprising
      a pair of diametrically opposed arcuate clamp members positioned around said first and second annular members,
      an assembly connecting a first pair of ends of said clamp members, and
      a releasable tightening assembly connecting a second pair of ends of said clamp members and adapted to exert a circumferential tightening force on said clamp members,
   said seal being resilient, torsionally flexible, metallic, and substantially C-shaped in cross section and comprising an annular central frustoconical portion which tapers with respect to the axes of said pipes, an annular first sealing portion having an arcuate cross section, and being located at one end of said central portion, and an annular second sealing portion having an arcuate cross section, and being located at the other end of said central portion, said seal being oriented such that said first sealing portion engages only said first member, and said second sealing portion engages both said first member outer surface and said second member.

2. A joint according to claim 1, wherein
said first member comprises
a first annular hub, and
a first annular flange coupled to said first hub.

3. A joint according to claim 2, wherein
said first flange has an inner surface in the form of a spherical segment,
said first member outer surface is located on said first hub and has substantially the same radius of curvature and engages said inner surface on said first flange.

4. A joint according to claim 3, wherein
said first hub has an integral annular stop flange extending outward therefrom, said stop flange being spaced inward from the end of the first hub,
said stop flange having a maximum diameter slightly larger than the minimum diameter of said inner surface of said first flange.

5. A joint according to claim 3, wherein
the largest diameter of the inner surface of said first flange is less than the largest diameter of the outer surface of the first member.

6. A joint according to claim 2, wherein
said first flange has an annular groove therein defining part of said cavity.

7. A joint according to claim 2, wherein
said coupling means is coupled to said first flange.

8. A joint according to claim 2, wherein
said second member comprises
a second annular hub, and
a second annular flange coupled to said second hub.

9. A joint according to claim 8, wherein
said coupling means is coupled to said first and second flanges.

10. A joint according to claim 8, wherein
said second flange has an annular groove therein defining part of said cavity.

11. A joint according to claim 8, wherein
said first flange has an annular groove therein defining part of said cavity, and
said second flange has an annular groove therein defining part of said cavity.

12. A joint according to claim 11, wherein
said outer surface on said first member defines part of said cavity.

13. A joint according to claim 8, wherein
said second flange is integrally formed with said second hub.

14. A joint according to claim 8, wherein
said first flange has an axially facing annular surface, and
said second flange has an axially facing annular surface engaging said axially facing annular surface on said first flange.

15. A joint for rigidly coupling first and second pipes having a fluid flowing therethrough, the combination comprising:

a first annular member rigidly coupled to the first pipe and having an outer surface in the form of a spherical segment;

a second annular member rigidly coupled to the second pipe and having an inner surface in the form of a spherical segment;

said inner and outer surfaces having substantially the same radius of curvature and being engaged, such engagement defining an interface;

coupling means, coupled to said first and second members, for rigidly coupling said first and second members together to resist relative axial movement and for radially inwardly compressing said first and second surfaces together to resist relative angular movement, said first and second members defining a cavity communicating with the interface of said inner and outer surfaces; and an annular resilient, torsionally flexible, metallic seal, located in said cavity, for resisting fluid escape from the first and second pipes through the interface of said inner and outer surfaces, said seal being substantially C-shaped in cross section and comprising an annular central frustoconical portion which tapers with respect to the axes of said pipes, an annular first sealing portion having an arcuate cross section, and being located at one end of said central portion, and an annular second sealing portion having an arcuate cross section, and being located at the other end of said central portion, said seal being oriented such that said first sealing portion engages only said first member including said first member outer surface, and said second sealing portion engages only said second member.

16. A joint according to claim 15, wherein
said first member comprises a first annular hub, and a first annular flange coupled to said first hub,
said second member comprises a second annular hub, and a second annular flange coupled to said second hub, and
said second flange comprises
a primary flange coupled to said second hub, and
a secondary flange coupled to said primary flange.

17. A joint according to claim 16, wherein
said second member inner surface is located on said secondary flange.

18. A joint according to claim 16, wherein
an annular seal is located between said primary and secondary flanges.

19. A joint according to claim 16, wherein
said secondary flange has an annular groove therein defining a part of said cavity.

20. A joint according to claim 15, wherein
the smallest diameter of said seal is slightly less than the largest diameter of said outer surface of said first member.

21. A joint according to claim 15, wherein
said seal substantially C-shaped cross section is open in a direction facing said interface of said inner and outer surfaces.

22. A joint for rigidly coupling first and second pipes having a fluid flowing therethrough, the combination comprising:
- a first annular member rigidly coupled to the first pipe and having an outer surface in the form of a spherical segment;
- a second annular member rigidly coupled to the second pipe and having an inner surface in the form of a spherical segment;
- said inner and outer surfaces having substantially the same radius of curvature and being engaged, such engagement defining an interface;
- coupling means, coupled to said first and second members, for rigidly coupling said first and second members together to resist relative axial movement and for radially inwardly compressing said first and second surfaces together to resist relative angular movement,
- said first and second members defining a cavity communicating with the interface of said inner and outer surfaces; and
- an annular seal, located in said cavity, for resisting fluid escape from the first and second pipes through the interface of said inner and outer surfaces,
- said coupling means comprising
  - a pair of diametrically opposed arcuate clamp members positioned around said first and second annular members,
  - an assembly connecting a first pair of ends of said clamp members, and
  - a releasable tightening assembly connecting a second pair of ends of said clamp members and adapted to exert a circumferential tightening force on said clamp members,
- said seal being resilient, torsionally flexible, metallic, and substantially C-shaped in cross section and comprising
  - an annular central frustoconical portion which tapers with respect to the axes of said pipes,
  - an annular first sealing portion having an arcuate cross section, and being located at one end of said central portion, and
  - an annular second sealing portion having an arcuate cross section, and being located at the other end of said central portion,
- said seal being oriented such that
  - said first sealing portion engages only said first member including said first member outer surface, and said second sealing portion engages only said second member.

23. A joint according to claim 22, wherein
- said seal substantially C-shaped cross section is open in a direction facing said interface of said inner and outer surfaces.

24. A joint for rigidly coupling first and second pipes having a fluid flowing therethrough, the combination comprising:
- a first annular member rigidly coupled to the first pipe and having an outer surface in the form of a spherical segment;
- a second annular member rigidly coupled to the second pipe and having an inner surface in the form of a spherical segment;
- said inner and outer surface having substantially the same radius of curvature and being engaged, such engagement defining an interface;
- coupling means, coupled to said first and second members, for rigidly coupling said first and second members together to resist relative axial movement and for radially inwardly compressing said first and second surfaces together to resist relative angular movement,
- said first and second members defining a cavity communicating with the interface of said inner and outer surfaces; and
- an annular resilient, torsionally flexible, metallic seal, located in said cavity, for resisting fluid escape from the first and second pipes through the interface of said inner and outer surfaces,
- said seal being substantially C-shaped in cross section and comprising
  - an annular central frustoconical portion which tapers with respect to the axes of said pipes,
  - an annular first sealing portion having an arcuate cross section, and being located at one end of said central portion, and
  - an annular second sealing portion having an arcuate cross section, and being located at the other end of said central portion,
- said seal being oriented such that
  - said first sealing portion engages only said first member, and said second sealing portion engages both said first member outer surface and said second member.

* * * * *